Patented Feb. 13, 1945

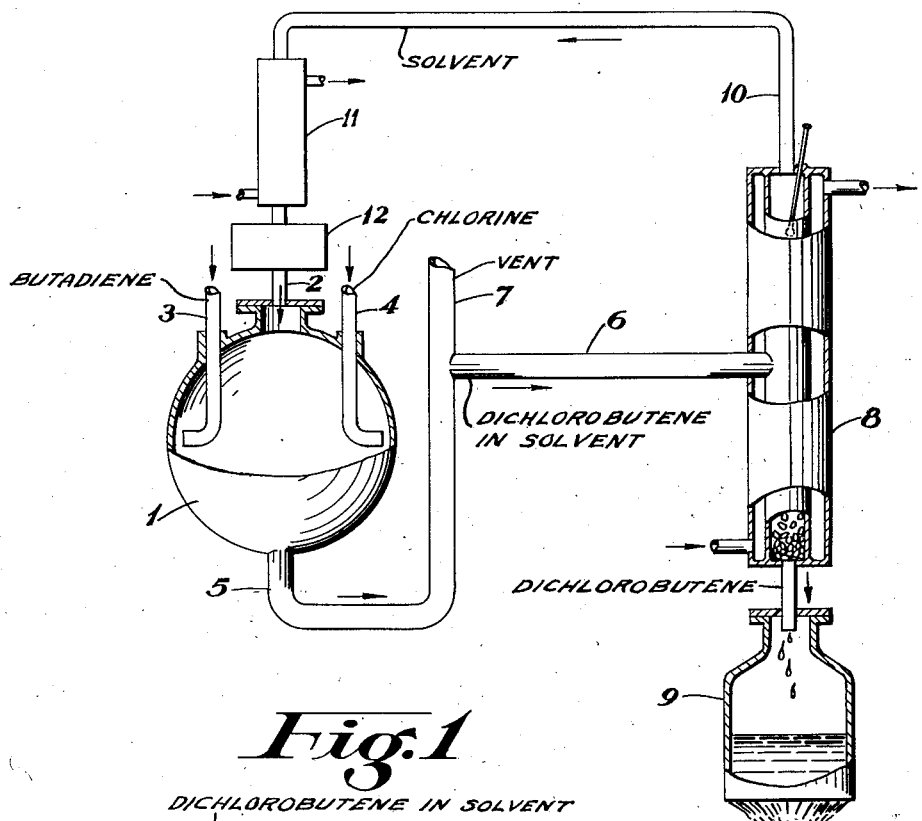
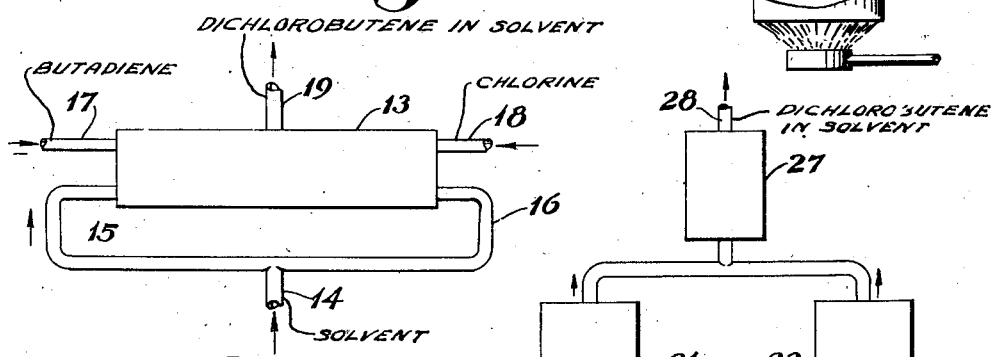

2,369,117

UNITED STATES PATENT OFFICE 2,369,117

PREPARATION OF DICHLOROBUTENES BY THE CHLORINATION OF BUTADIENE

Albert Smith Carter, Wilmington, Del., assignor to E. I. du Pont de Nemours & Company, Wilmington, Del., a corporation of Delaware Application March 9, 1940, Serial No. 323,097

8 Claims. (Cl. 260—654)

This invention relates to the chlorination of butadiene. More particularly, it relates to an improved process for the preparation of dichlorobutenes by the chlorination of butadiene.

It is known in the art that butadiene can be chlorinated to produce two dichlorobutenes; e. g., 1,2-dichloro-3-butene and 1,4-dichloro-2-butene. Muskat, in U. S. Patent No. 2,038,593, discloses that this result may be accomplished by simultaneously introducing butadiene and chlorine below the surface of an inert solvent. His apparatus is illustrated on page 4052 J. A. C. S. 52. However, Muskat's process gives poor yields of the dichlorobutenes. Thus, it is not unusual to obtain a residue in the Muskat process equivalent to 30–40 per cent of the starting material. Apparently, this residue, which is relatively non-volatile, is a chlorinated polymer of butadiene formed at a temperature below that at which butadiene would be expected to polymerize readily. Moreover, considerable quantities of tetrachlorobutane are formed by the process of Muskat.

It is an object of this invention to discover an improved process for the manufacture of dichlorobutenes. Another object is a process for reacting butadiene with chlorine to produce dichlorobutenes in good yield. A further object is a continuous process for the economic production of dichlorobutenes. Other objects will appear hereinafter.

These objects have been accomplished by the discovery that overchlorination and the formation of undesirable polymers is largely avoided by first dissolving each reactant in an inert solvent and then conducting the chlorination of butadiene by mingling the two solutions. Preferably, this is done by adding each reactant to a stream of flowing solvent, bringing the resulting solutions together, separating the reaction products from the solvent, and recirculating the solvent.

In the drawing:

Figure I diagrammatically represents an apparatus with one type of reactor suitable for use in the present invention;

Figure II diagrammatically represents a plan view of a second type of reactor; and Figure III diagrammatically represents a plan view of a third type of reactor.

As has been above indicated, the process is preferably carried out by adding the reactants to a flowing solvent in such manner that each reactant is dissolved and diluted by the solvent before it comes into contact with the other reactant. This may be accomplished in any suitable way and the three figures of the drawing illustrate the method of bringing the reactants together.

Referring now to Figure I, an inert solvent liquid is introduced into reactor 1 through conduit 2. Butadiene and chlorine are introduced into the reactor through conduits 3 and 4 respectively. The reactants dissolve in the solvent before meeting in the central part of the reactor. The reaction mixture leaves the reactor at 5 and passes through conduit 6 which is vented at 7 to packed fractionating column 8. The temperature of this column is so controlled that the products are recovered in collection vessel 9 while the solvent passes off at 10 and is condensed in condenser 11, whence it passes to storage vessel 12 from which it is recirculated to the reactor through conduit 2.

Figure II shows an alternative form of reactor 13 wherein the solvent from storage vessel (not shown) passes through conduit 14, and enters reactor 13 at opposite ends thereof through 15 and 16. The butadiene and chlorine enter at 17 and 18 respectively. After dissolving, the reactants meet in the reactor 11 and the reaction mixture is expelled at 19, the rest of the cycle being as in Figure I.

In Figure III, the solvent from storage vessel (not shown) passes through 20 and enters solution chambers 21 and 22 through conduits 23 and 24. Into solution chamber 21, a stream of butadiene enters through conduit 25, and chlorine enters chamber 22 through 26. The solutions from chambers 21 and 22 then pass to reaction chamber 27 and the reaction products pass to the packed fractionating column (not shown) through conduit 28.

In order that the invention may be more fully understood, the following specific example is given by way of illustration, but the invention is not limited thereto as will be more fully apparent hereinafter.

*Example*

A reactor of the type illustrated in Figure III was installed in the system illustrated in Figure I in place of reactor 1. The collection vessel 9 at the bottom of the fractionating column 8 was kept at a temperature about the boiling point of the dichlorobutenes. The temperature of the fractionating column was so controlled that low boiling material, volatile below 65° C., was allowed to escape through 10 into condenser 11 from which the condensate was collected in storage tank 12. The storage tank was charged with chloroform which was allowed to flow through conduit 20 at a rate of 10,000 parts by weight per hour (5,000 parts into each of conduits 23 and 24). The chloroform left the reactor by conduit 28 from whence it passed into fractionating column 8 where it was vaporized, passed to condenser 11, and returned to the storage tank 12 for recirculation. When the circulation of chloroform was established, butadiene was introduced at 25 and chlorine in 26 at the rates of 355 parts by weight and 270 parts by weight respectively per hour. Suitable flow meters and valves were incorporated into the system in order to control these rates of flow. After the system had come to equilibrium, approximately 625 parts of product per hour was collected from the collecting chamber at the bottom of the column and an analysis of the product indicated that the yield of monomeric dichlorobutenes was over 90 per cent.

During the reaction of chlorine with butadiene, considerable heat is involved. To control the reaction, it may be desirable to jacket and cool the reaction chamber 27. The same purpose may be accomplished by precooling the chloroform before introduction into the mixing and reaction chambers.

Any solvent will work which is a liquid and is practically inert under conditions of reaction. In place of the chloroform, for example, carbon tetrachloride, carbon bisulfide, etc., may be used. Saturated hydrocarbons such as, for example, butane, hexane, etc., may be used, but are less satisfactory because they are not entirely inert. Preferably, the solvent is relatively volatile; thereby simplifying the subsequent operation from the dichlorobutenes as has been illustrated in the example. It is to be understood, however, that the invention is limited neither to volatile solvents nor to the particular apparatus shown since other types of solvents and operating apparatus could be used while carrying on a continuous process. Alternatively, the process could be carried out as a batch reaction.

The temperature of the reaction is not critical. For example, it has been successfully conducted at a temperature as low as $-80°$ C. and at elevated temperatures above $100°$ C. At elevated temperatures, secondary reactions tend to be promoted, such, for example, as substitutions and dehydrohalogenation. Polymerization is also promoted at elevated temperatures. Accordingly, it is preferred to operate as a liquid phase below $70°$ C. In order to obtain the best yields and highest conversions, it is desirable that the chlorine and butadiene should be introduced in substantially equimolecular proportions. However, the invention is not limited thereto and other proportions may be used.

The surprisingly good yields which are obtainable according to the process of the present invention appear to be correlated with the fact that the reactants are dissolved before they are permitted to come into contact with each other. The diluent action of the solvent appears to promote the desired reaction to the exclusion of undesirable wide reactions. Where relatively concentrated solutions are used, it has been observed that a decrease in concentration of solution results in substantial increase in yields. This effect becomes less marked as the concentration of reactants of solution becomes lower. Accordingly, it is preferred to operate the process with from 5–50 volumes of inert liquid per volume of liquid butadiene. A ratio of volume of inert liquid to volume of liquid butadiene of from 20–40 is especially preferred. Where low concentrations of solvent are used, it is desirable to cool the solvent before or while it comes into contact with the reactants in order to increase the solubility of the latter. Thus, the solvent may be advantageously cooled to a temperature of from $+5°$ C. to $-25°$ C.

The use of a flowing solvent is also an important part of the invention. The best results herein achieved could not be accomplished by mere agitation. The flowing solvent brings the reactants together and then carries away the products before they have an opportunity to react with more raw materials. Thus, the chlorination is stopped with the formation of dichlorobutenes and also the tendency toward polymerization is minimized. In addition to these advantages, which produce high yields of the desired products, the flowing solvent method readily adapts itself to a continuous process, as has been illustrated, and makes for economic commercial production.

By carrying out the chlorination of butadiene according to the process of the present invention, it has been found possible to obtain yields of above 90 per cent dichlorobutene as against prior art methods which gave yields below 60 per cent. Moreover, the process herein described provides a means for continuously carrying on the said reaction in an economical manner and on a commercial scale. The absence of by-products and polymeric material greatly simplifies the procedure.

It is apparent that many widely different embodiments of this invention may be made without departing from the spirit and scope thereof, and, therefore, it is not intended to be limited except as indicated in the appended claims.

I claim:

1. Process for the production of dichlorobutenes which comprises dissolving butadiene in one portion of inert solvent, dissolving chlorine in an amount insufficient for complete addition reaction in another portion of inert solvent, and mixing the solutions.

2. Process for the production of dichlorobutenes which comprises dissolving butadiene in one portion of a flowing inert solvent, dissolving chlorine in an amount insufficient for complete addition reaction in another portion of flowing inert solvent, and flowing the two solutions together.

3. Process for the production of dichlorobutenes which comprises dissolving butadiene in one portion of a flowing inert volatile solvent, dissolving chlorine in an amount insufficient for complete addition reaction in another portion of flowing inert volatile solvent, and flowing the two solutions together.

4. Process for the production of dichlorobutenes which comprises dissolving butadiene in one portion of a flowing inert volatile solvent, dissolving chlorine in another portion of flowing inert volatile solvent, and flowing the two solutions together, the butadiene and chlorine being maintained in substantially molecular proportions.

5. Process for the production of dichlorobutenes which comprises dissolving butadiene in at least two and one-half times its liquid volume of flowing inert volatile solvent, dissolving substantially equivalent amount of chlorine in a similar volume of inert volatile solvent, and flowing the two solutions together.

6. Process for the continuous production of dichlorobutenes which comprises continuously dissolving butadiene in one portion of a flowing inert solvent, continuously dissolving chlorine in an amount insufficient for complete addition reaction in another portion of a continuously flowing inert solvent, continuously flowing the two solutions together, and continuously separating the reaction products from the solvent.

7. Process for the continuous production of dichlorobutenes which comprises continuously dissolving butadiene in one portion of a flowing inert solvent, continuously dissolving chlorine in an amount insufficient for complete addition reaction in another portion of a flowing inert solvent, continuously flowing the two solutions together, continuously separating the reaction products from the solvent, and continuously recirculating the solvent.

8. Process for the continuous production of dichlorobutenes which comprises continuously dissolving butadiene in one stream of an inert volatile solvent, continuously dissolving chlorine in an amount insufficient for complete addition reaction in another stream of inert volatile solvent, continuously flowing the two solutions together, continuously separating the reaction products from the solvent, and continuously recirculating the solvent.

ALBERT S. CARTER.